United States Patent
Hoffmann et al.

(10) Patent No.: US 11,337,046 B2
(45) Date of Patent: May 17, 2022

(54) CONTROL PLANE USER PLANE CORRELATION FUNCTION

(71) Applicant: NOKIA SOLUTIONS AND NETWORKS OY, Espoo (FI)

(72) Inventors: Klaus Hoffmann, Munich (DE); Gerald Goermer, Wandlitz (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/099,103

(22) PCT Filed: May 4, 2016

(86) PCT No.: PCT/EP2016/060065
§ 371 (c)(1),
(2) Date: Nov. 5, 2018

(87) PCT Pub. No.: WO2017/190783
PCT Pub. Date: Nov. 9, 2017

(65) Prior Publication Data
US 2019/0208379 A1    Jul. 4, 2019

(51) Int. Cl.
*H04W 4/24* (2018.01)
*H04L 12/14* (2006.01)
(Continued)

(52) U.S. Cl.
CPC .......... *H04W 4/24* (2013.01); *H04L 12/1407* (2013.01); *H04M 15/66* (2013.01); *H04L 43/028* (2013.01); *H04W 84/045* (2013.01)

(58) Field of Classification Search
CPC ..... H04W 4/24; H04W 84/04; H04W 84/045; H04M 15/66
See application file for complete search history.

(56) References Cited

U.S. PATENT DOCUMENTS

2015/0333991 A1* 11/2015 Liu ................ H04L 43/0829
                                                            455/406
2016/0174055 A1*  6/2016 Wang ............... H04L 12/1407
                                                            370/259
(Continued)

FOREIGN PATENT DOCUMENTS

WO    2014/169877 A1   10/2014
WO    2015/024838 A1    2/2015

OTHER PUBLICATIONS

3GPP TR 23.714 V0.4.0, "3rd Generation Partnership Project; Technical Specification Group Services and System Aspects; Study on control and user plane separation of EPC nodes (Release 14)," Apr. 25, 2016, 72 pages (Year: 2016).*

(Continued)

*Primary Examiner* — Jinsong Hu
*Assistant Examiner* — Farideh Madani
(74) *Attorney, Agent, or Firm* — Squire Patton Boggs (US) LLP

(57) ABSTRACT

A method and an apparatus for use in a communication network are provided. First protocol elements are acquired from a user plane of a first network entity of the communication network, the first network entity having a split network function into the user plane and a control plane. Second protocol elements are acquired from the control plane of the first network entity, and third protocol elements are generated from the first and second protocol elements for a second network entity of the communication network, the second network entity being separate from the first network entity.

10 Claims, 5 Drawing Sheets

(51) Int. Cl.
*H04M 15/00* (2006.01)
*H04L 43/028* (2022.01)
*H04W 84/04* (2009.01)

(56) References Cited

U.S. PATENT DOCUMENTS

2016/0254958 A1* 9/2016 Chen .................. G06F 9/45558
709/220
2016/0359902 A1* 12/2016 Petrilak ................ H04Q 3/0091
2017/0127218 A1* 5/2017 Kathuria ............... H04M 15/80

OTHER PUBLICATIONS

International Search Report and Written Opinion dated Dec. 16, 2016, corresponding to International Patent Application No. PCT/EP2016/060065.
3GPP TR 23.714 V0.4.0, "3rd Generation Partnership Project; Technical Specification Group Services and System Aspects; Study on control and user plane separation of EPC nodes (Release 14)," Apr. 25, 2016, 72 pages.
European Office Action issued in corresponding European Patent Application No. 16 721 415.4-1213 dated Dec. 4, 2019.
3GPP TS 23.401 V13.6.1 (Mar. 2016), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 13), Mar. 2016.
3GPP TS 32.251 V13.4.0 (Mar. 2016), Technical Specification, 3rd Generation Partnership Project; Technical Specification Group Services and System Aspects; Telecommunication management; Charging management; Packet Switched (PS) domain charging (Release 13), Mar. 2016.
3GPP TS 32.240 V13.1.0 (Mar. 2016), Technical Specification, 3rd Generation Partnership Project; Technical Specification Group Services and System Aspects; Telecommunication management; Charging management; Charging architecture and principles (Release 13), Mar. 2016.
3GPP TS 23.203 V13.7.0 (Mar. 2016), Technical Specification, 3rd Generation Partnership Project; Technical Specification Group Services and System Aspects; Policy and charging control architecture (Release 13), Mar. 2016.

* cited by examiner

CONTROL PLANE USER PLANE CORRELATION FUNCTION

BACKGROUND OF THE INVENTION

Field of the Invention

The present invention relates to a control plane user plane correlation function. For example, the present invention relates to the integration of a charging trigger function in a network architecture with user plane and control plane separation.

Related Background Art

Prior art which is related to this technical field can e.g. be found in:
3GPP TS 32.240
3GPP TS 23.401
3GPP TS 23.203
3GPP TS 32.251

The following meanings for the abbreviations used in this specification apply:
ADF Accounting Data Forwarding
AMC Accounting Metrics Collection
BAC Billing, accounting and charging system
BGF Border gateway
CHS Charging System, i.e. OFCS and/or OCS
CP Control Plane
CPUPCF Control Plane User Plane Correlation Function
CTF Charging Trigger Function
eNB evolve Node B
eNB-U eNB user plane
eNB-C eNB controller
EPC Evolved Packet Core
Forces Forwarding and Control Element Separation
IMS IP Multimedia System
GTP-U GPRS Tunneling Protocol User plane
OCS Online Charging System
OF Open Flow
OFC OF Controller
OFCS Offline Charging System
PCEF Policy and Charging Enforcement Function
PCRF Policy and Charging Rules Function
PGW Packet Gateway
PGW-C PGW controller
PGW-U PGW user plane
RAN Radio Access Network
RAT Radio Access technology
SDN Software Defined Network
SDN-C SDN controller
SGW Serving Gateway
SGW-C SGW controller
SGW-U SGW user plane
SPR Subscription Profile Repository
TDF Traffic Detection Function
TDF-C TDF controller
TDF-U TDF user plane
TEID Tunnel Endpoint ID
TSSF Traffic Steering Support Function
UP User Plane
VNF Virtual Network Function During the research on SDN as well as on VNF, the split of the treatment for the traffic into control plane (CP) and user plane (UP) is heavily discussed. Beside of several other issues, for example, the collection of resource usage data of the traffic and the generation of the charging events by the Charging Trigger Function (CTF) is affected. The CTF is the focal point for the collection which is realized with the embedded functional blocks, the Accounting Metrics Collection (AMC) and the Accounting Data Forwarding (ADF) as specified in 3GPP TS 32.240 clause 4.3.1.1.

Within the 3GPP SDN architecture there is no specification available how the CTF could proceed with the spitted network function into CP and UP. Additionally the CTF provides the external charging reference point and the corresponding function for the charging interface protocol with the ADF, which should be not affected. Hence, the CTF should be implemented in the CP as well as in the UP and consequently will the ADF in the CP as well as the ADF in the UP generate charging events towards the Charging System (CHS).

SUMMARY OF THE INVENTION

At least some embodiments of the invention aim at providing a control plane user plane correlation function. For example, according to an exemplary embodiment of the invention, a CTF is provided for offline and online charging that is able to fulfil the requirements for the CP/UP split.

According to aspects of the invention, this is achieved by the method and apparatus as well as the computer program product as defined in the appended claims.

In the following the invention will be described by way of embodiments thereof with reference to the accompanying drawings.

DESCRIPTION OF THE EMBODIMENTS

Figure 1:
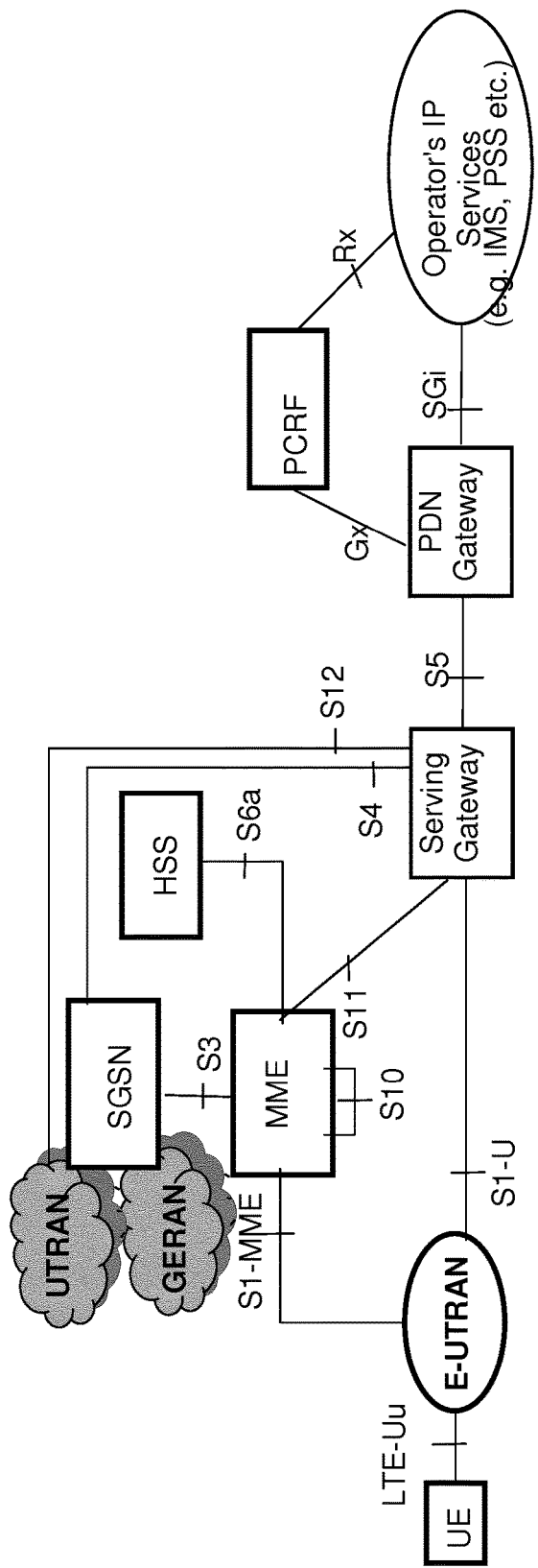
FIG. 1 shows a non-roaming architecture for 3GPP accesses.
Figure 2:
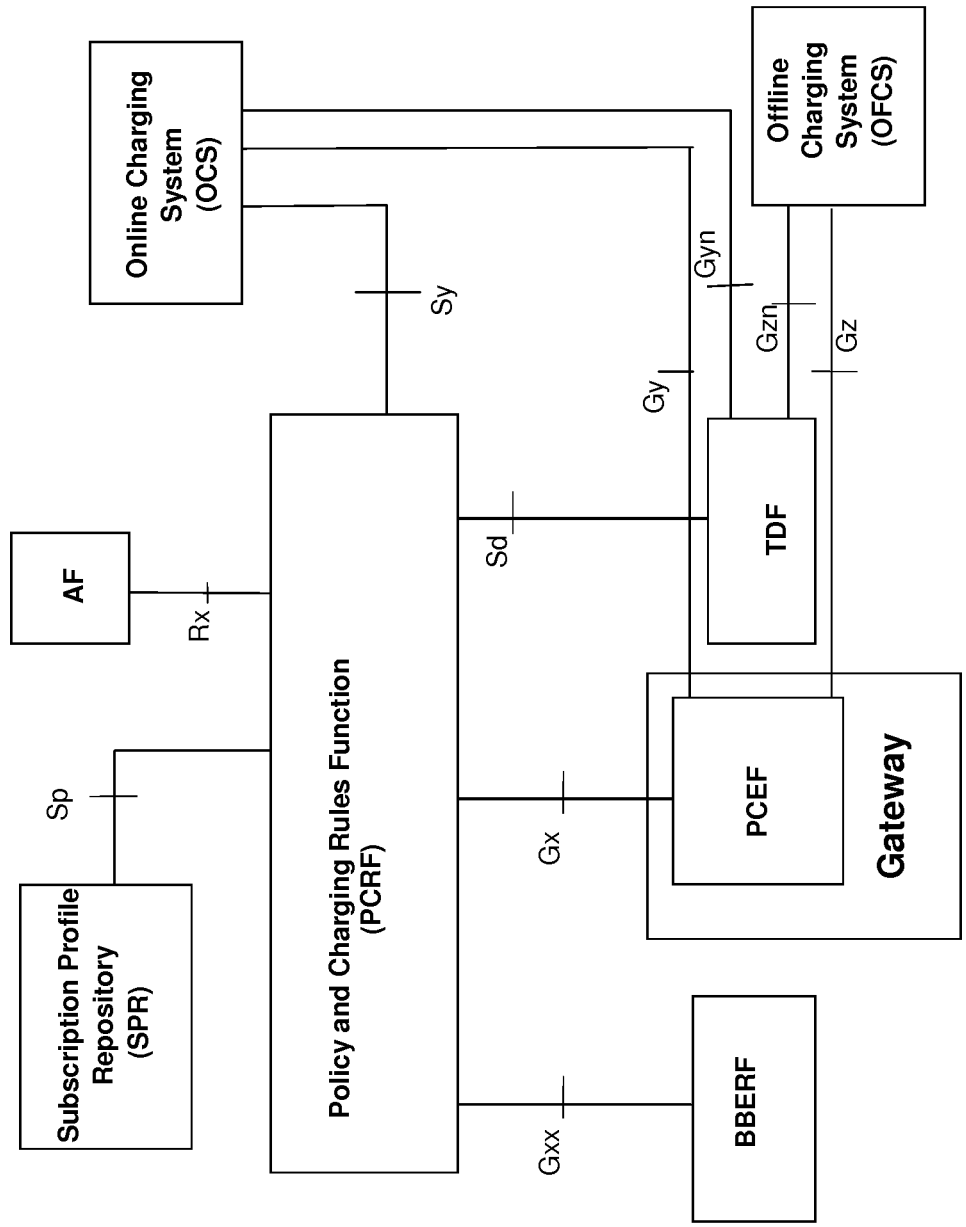
FIG. 2 shows an overall PCC logical architecture (non-roaming) when SPR is used.

The 3GPP reference architecture used for the future SDN architecture and shown in FIG. 1 is specified in 3GPP TS 23.401, and the corresponding functional details for Charging and Policy Control (PCC) shown in FIG. 2 are specified in 3GPP TS 23.203.

According to the definition of charging functions in 3GPP TS 32.240, the CTF is the logical equivalent to PCEF as well as TDF with the corresponding support of the charging reference points to the CHS, which could be represented either as the OFfline Charging System (OFCS) or Online Charging System (OCS). These reference points are defined in 3GPP TS 32.251 with Gz for the PCEF and Gzn for the TDF to the OFCS and with Gy for the PCEF and Gyn for the TDF to the OCS.

Following the SDN approach, the 'gateway' architecture (see FIG. 2), presenting one of affected core network nodes, will be adapted for the CP/UP split and it has to be specified on how the CTF (PCEF) is to be located in conjunction with the split within 3GPP. Furthermore, interworking between CP and UP has to be specified if the CTF (PCEF) is additionally affected.

Based on the logical PCC architecture, here it is proposed to integrate the CTF with the following options for the unchanged support of the charging reference points:
1. CTF-CP connected with CHS
2. CTF-UP connected with CHS
3. CTF-UP and CTF-CP connected with SDN controller (SDN-C) which interacts to CHS The three options may be configured per service. For instance, in case of IoT services the option 1 or option 2 may be preferred. Whereas in case of legacy services with high payload bandwidth the option 3 would be the best choice.

Option 1: CTF-CP Interacts with the CHS

CTF-CP controls a charging session based on configured charging instructions or Rx or GTP-C signaling information, the instructions coming from a subscriber database (HSS), and interacts with charging related information to the CHS (e.g. OCS/OFCS) based on received traffic data from the UP and/or via the SDN controller which may be part of the gateway (e.g. PGW) shown in FIG. 2.

Consequently, the CP requests the UP via the SDN-C by existing means, e.g. means of an OPenFlow protocol, to collect required data (e.g. volume, time) and a corresponding response after consumption.

The CP is responsible to carry a PGW-C name/ID together with an IP address towards the CHS. Normal OpenFlow/North bound protocol means may be used for correlation with the measured traffic data and consequently for the generation of the charging events towards the CHS.

Option 2: CTF-UP Interacts with the CHS

CTF-UP controls a charging session based on received instructions from the CP and interacts with the charging related information to the OCS/OFCS with the collected traffic data. As with option 1, the CP is instructed by the charging configuration, Rx or GTP-C signaling and forwards these instructions (via the SDN-C which may be part of the gateway shown in FIG. 2) to the U-plane. In this option, the CP may request the UP via the SDN-C e.g. by existing means of the OPenFlow protocol, to collect required data (e.g. volume, time), but additionally it is suggested that the North bound and OpenFlow interface is augmented with at least the following information elements "charging characteristics", i.e., ChargingID, OCS addresses, OFCS addresses, etc., when setting up a GTP Flow according to 3GPP TS 32.251 in the OpenFlow Message Add_Flow, Mod_Flow, etc., such that the user plane part of the GW will be able to contact e.g. the OCS directly, thus bypassing an OpenFlow controller/gateway control plane.

For instance, the existence of a new OCS or OFCS information element in the OpenFlow Protocol is interpreted by the U-plane to send the charging information directly to the OCS and/or OFCS.

Hence, instead of sending the charging related information via the SDN controller to the charging application it is suggested to send that information directly to the OCS/OFCS.

For example, the GW-U plane reports the corresponding information directly to the OCS, OFCS via the corresponding Gy, Gz interface shown in FIG. 2 as indicated in the OpenFlow message above.

The UP is responsible to carry the PGW-U name/ID together with the IP address and will use this information for the correlation with the measured traffic data and consequently for the generation of the charging events towards the CHS.

Option 3: SDN-C Interacts with the CHS

The SDN-C, which may be part of the gateway shown in FIG. 2, controls a charging session based on the received instructions from the CP (as with option 2) and received traffic data from the UP (as with option 1) and interacts with the charging related information to the CHS.

As with option 1, the CP is instructed by the charging configuration, Rx or GTP-C signaling and forwards these instructions (via the SDN controller) to the U-plane.

Therefore, it is suggested that the North bound interface is augmented with at least the following information elements "Charging Characteristics", i.e., ChargingID, OCS addresses, OFCS addresses, etc., when setting up a GTP Flow, described in more detail in 3GPP TS 32.251, in the OpenFlow Message Add_Flow, Mod_Flow, etc., such that the SDN-C part of the GW will be able to contact e.g. the OCS directly, thus bypassing an OpenFlow controller/Gateway control plane.

E.g. a new additional flag "SDN controller to terminate the Gy" interface in the northbound interface is introduced such that the SDN-C knows that the UP is to be requested for the volume and time data information via normal OpenFlow means, but that the SDN-C is to collect those data from the UP and to terminate the e.g. Gy interface at the SDN-C.

The SDN-C is responsible for carrying an SDN-C name/ID together with an IP address. Normal OpenFlow/North bound protocol means may be used for the correlation with the measured traffic data and consequently for the generation of the charging events towards the CHS.

It is to be noted that the above principles are not limited to the PCEF only, but may also be applied to the Traffic Detection Function (TDF), Traffic Steering Support Function (TSSF), Evolved Packet Data Gateway (ePDG) and/or the Bearer Binding and Event Reporting Function (BBERF) as well.

It is further noted that the mechanism suggested for the gateway (e.g. packet gateway) U/C and the corresponding OpenFlow controller is not limited to this scenario only as it generally may similarly be applied to any other gateway like SGW, BRoadband Access Server (BRAS) or ePDG, etc.

In addition, the same principle can also be applied to a decomposed BRAS, SGSN, Media gateway, IMS MGW and TrGW.

It is noted that OpenFlow is just an example for the means to instruct the user plane to connect/report to the CHS, because Forces (or a similar protocol) may be used instead as well.

Bypassing the OFC/SDN-C and the GW-C plane does not burden the OpenFlow interface and the OFC/Control plane with additional traffic and computation requirements and eliminates a single point of failure. Hence, option 2 is a preferred implementation.

Furthermore it is clear that with the above options 1, 2 and 3, the relevant information (for online and offline charging) is not sent twice through the network as the charging records data is directly sent towards the OFCS and OCS instead of sending it via two "hops" to the OFCS and OCS.

The C-plane solution (option 1 and/or option 3) increases the charging signaling traffic between the u-plane and the c-plane significantly. Therefore, option 2 is most beneficial.

Thus, placement of the charging interfaces at the user plane in case of the split of PGW and TDF is desirable, and the same applies to IMS as well.

Figure 3:
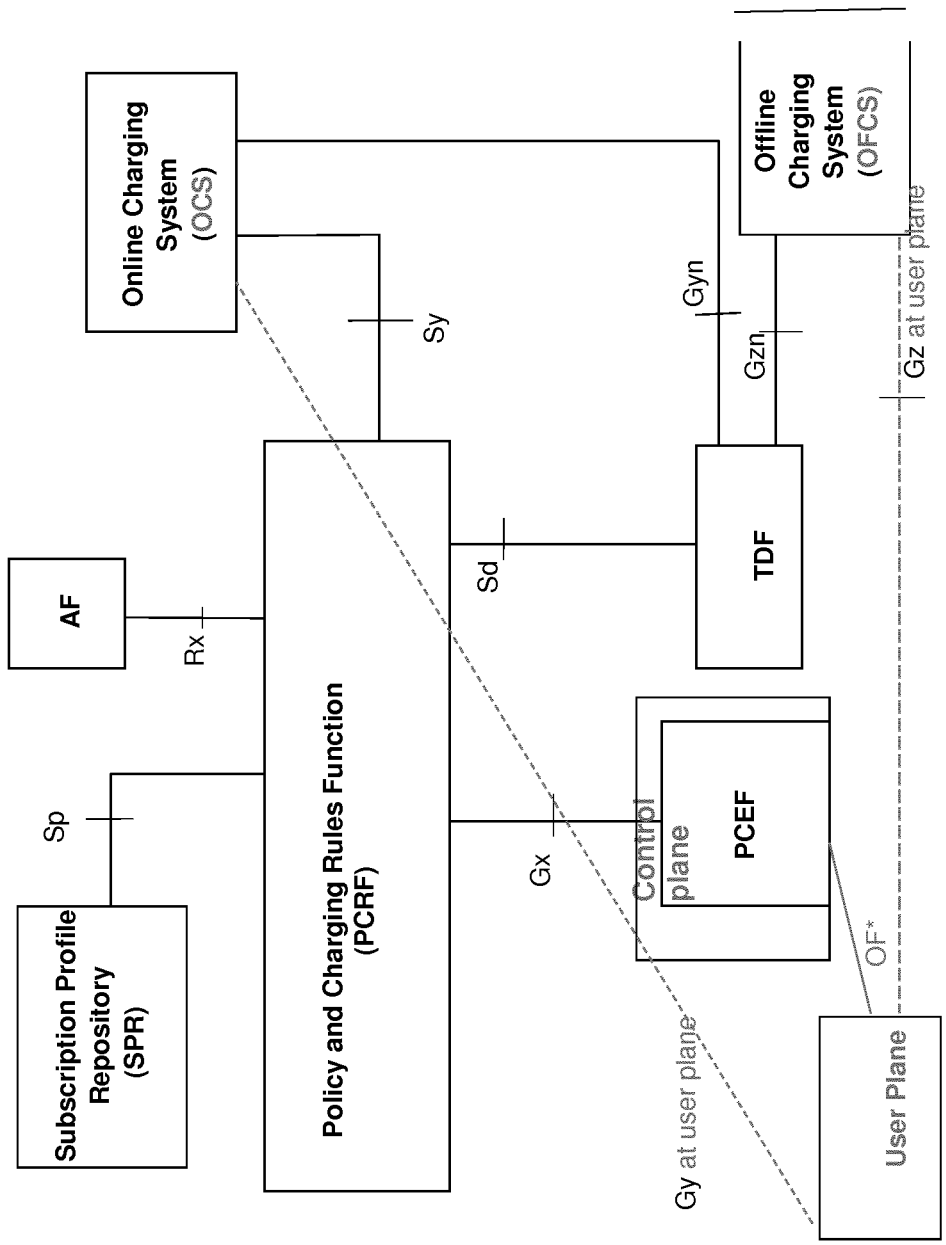
FIG. 3 shows a modified overall PCC logical architecture (non-roaming) when SPR is used, according to an embodiment of the invention.

In the following, an implementation example according to option 2 is described. The example solution for the decomposition of the PGW is shown in FIG. 3, illustrating a modified logical architecture (non-roaming) when SPR is used.

Between the user plane and the control plane, modified OF, i.e. OF*, is used, and Gy and Gz are terminated at the user plane.

It is to be noted that the PGW is just an example, and the same mechanism may be applied to a decomposed SGW and eNB. The principle can also be applied to the IMS. For instance in the IMS the Proxy-Call Session Control Function (P-CSCF) carries the control plane and the session border gateway/BGW/BGF and/or the Media Gateway (MGW) hosts the user plane.

Since it is expected that the traffic will increase significantly in the next future it is important that any transport capacity utilized is as efficient as possible, which requires that information is not sent/duplicated unnecessarily across the underlying network which connects the decomposed EPC/E-UTRAN nodes.

It is noted that the Gz, Gy and Gzn, Gyn interfaces are just examples. As with the PGW also the TDF may be split apart, and the Gzn interface and the Gyn interface may be terminated at the user plane.

Figure 4:
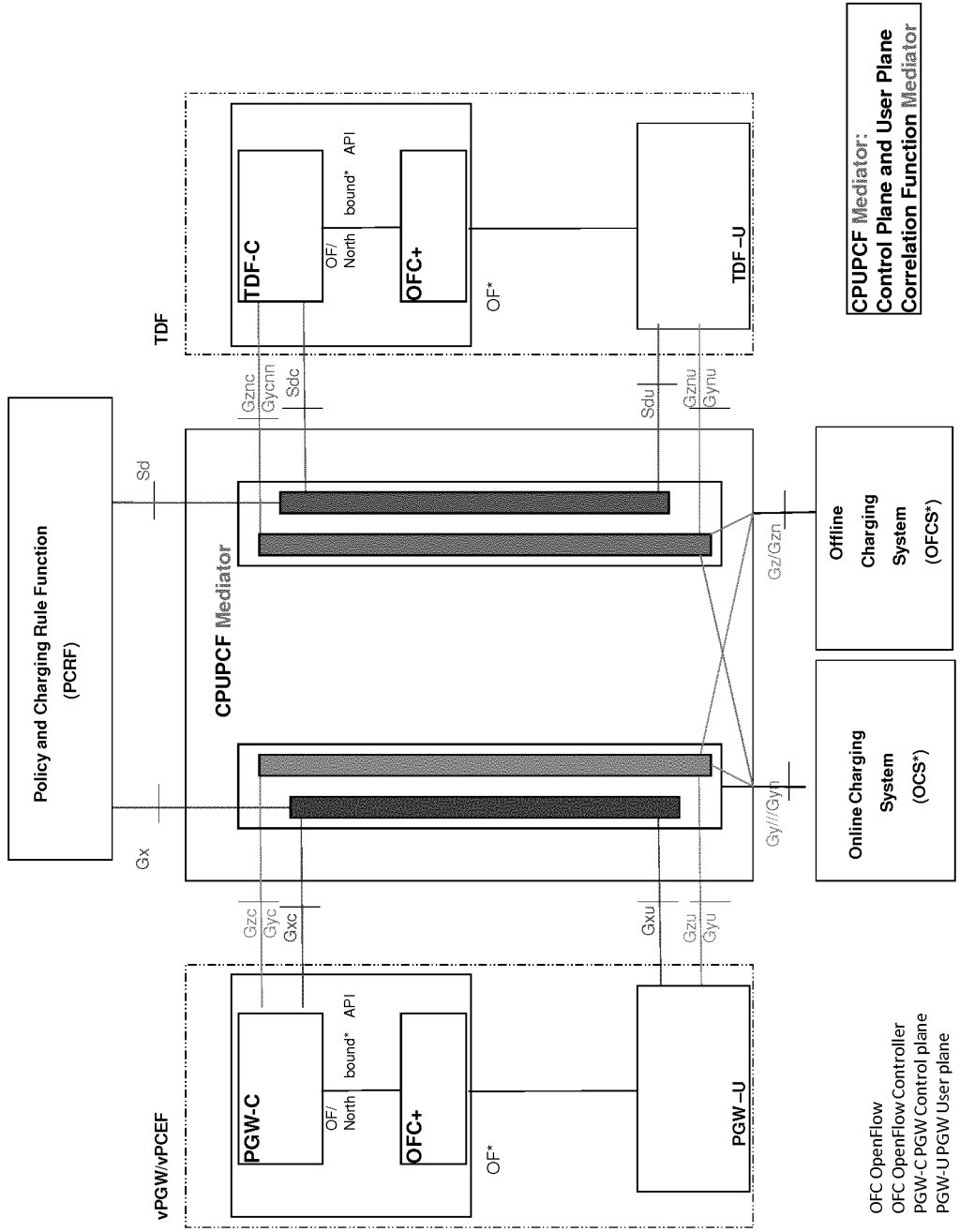
FIG. 4 illustrates a CPUPCF connected to decomposited PGW and TDF, according to an embodiment of the invention.

As a further refinement of option 2, a general mediation (mediator) function CPUPCF (Control plane and user plane correlation function) is introduced, as illustrated in FIG. 4. As shown in FIG. 4, a CPUPCF is connected to decomposed PGW and TDF.

As can be seen from FIG. 4, the CPUPCF is placed between the decomposed PGW and OCS/OFCS (for Gz, Gy and Gzn, Gyn). Optionally and as a further generalisation the CPUPCF also supports correlation and mediation for a Gx interface. In the following emphasize is given to the PGW function. However, the TDF with its interfaces Sd and Gyn, Gzn can be handled similarly in the CPUPCF.

According to an implementation example of the present invention, the Gx interface is terminated at the CPUPCF, where the correlation function responsible for the Gx interface splits the incoming Gx protocol message into the Gxc (Gx for the control plane) and Gxu (Gx for the user plane) parts and forwards them to PGW-C and PGW-U, respectively.

Alternatively, the Gxu interface may be tunneled via/on the Gxc interface from the PGW-C via OFC to the PGW-U, or vice versa.

On receipt of Gxc and Gxu protocol elements sent from PGW-C and PGW-U to the CPUPCF, the CPUPCF collects and integrates them and forwards them to the PCRF.

According to an alternative implementation example of the present invention, the Gx interface may be terminated directly at the PGW-C. In this case the PCRF is not impacted by the introduction of the CPUPCF.

Once the PGW-C and PGW-U functions have been informed about location and ID of the CHS and the CPUPCF, both the PGW-C and PGW-U functions are able to submit the requested information towards the CHS.

For instance, independently, the PGW-C issues via the new Gyc and the PGW-U issues via the new Gyu the requested information towards the CPUPCF. The CPUPCF in turn collects this information and composes Gy protocol elements towards the OCS.

Again, it is noted that the PGW is just an example, and the same mechanism may be applied to the decomposed SGW and eNB.

Further, the Gz, Gy and Gzn, Gyn interfaces and their modified versions are just examples.

It is to be noted that, from the CPUPCF point of view, the PGW-U and the TDF-U in principle can be the same, thus minimizing the number of U-planes and therefore hops involved.

Furthermore, from an implementation point of view, the CPUPCF may be placed on the CP, UP or the SDN-C/OFC.

The above described option 2 and its refinement may represent the best solution as it does not impact existing OCS/OFCS implementations and/or limit the impact of PCRF/OCS/OFCS, as major changes are kept within the PGW that is impacted anyhow by the split of user plane and control plane.

Figure 5:
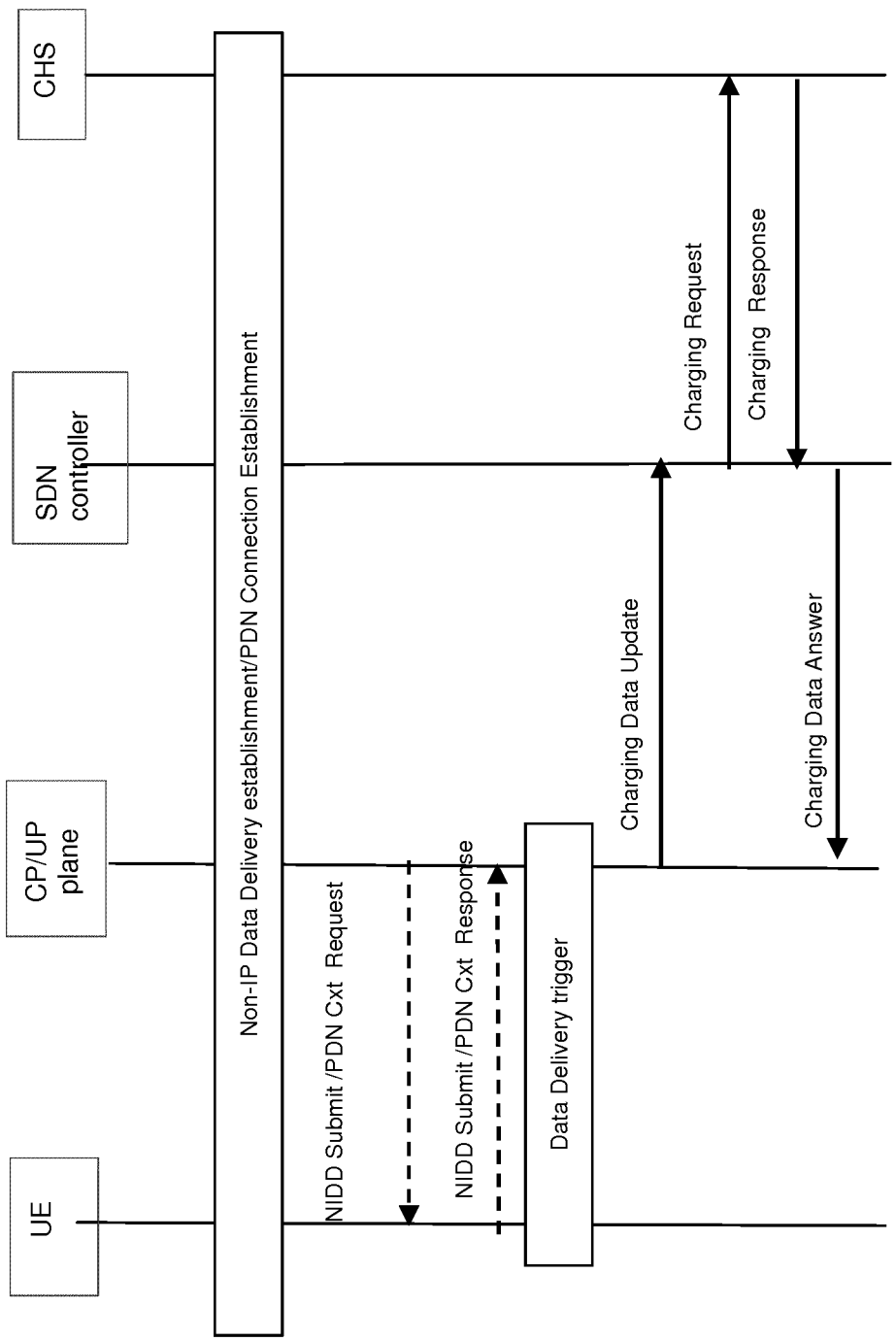
FIG. 5 illustrates a signal flow diagram for CP/UP level communication for non-IP data delivery and PDN connection.

FIG. 5 illustrates a signaling flow diagram for Non-IP Data Delivery (NIDD) and PDN connection, according to an embodiment of the invention.

A CP/UP entity sends an NIDD submit request or PDN connection request/response to a UE. The UE performs NIDD delivery handling or data delivery trigger and sends an NIDD submit response to the CP/UP entity. The CP/UP entity sends a charging data update message to an SDN controller. The SDN controller sends a charging request to a CHS based on the updated charging data. The CHS response with a charging response to the SDN controller, which sends a charging data answer message to the CP/UP entity.

The signaling diagram shown in FIG. 5 may be implemented with the above options 1, 2 and 3 as follows:

Option 1: CP of the CP/UP entity acts as the SDN controller and gets UP data for the submission to the CHS.

Option 2: CP of the CP/UP entity forwards data to UP of the CP/UP entity, and the UP acts as the SDN controller.

Option 3: CP and UP send data to the SDN controller.

Figure 6:
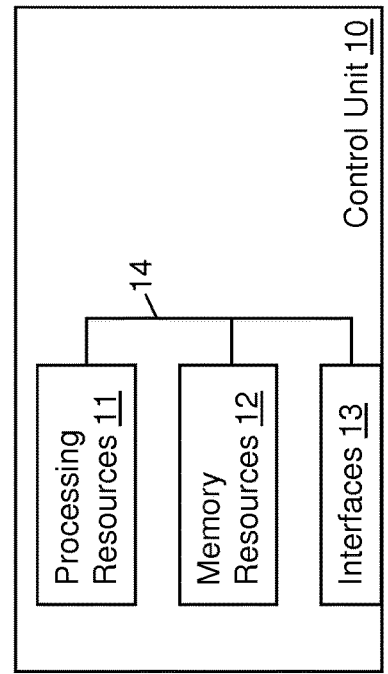
FIG. 6 shows a schematic block diagram illustrating a configuration of a control unit in which examples of embodiments of the invention are implementable.

FIG. 6 shows a schematic block diagram illustrating a configuration of a control unit in which examples of embodiments of the invention are implementable. The control unit 10 may be part of and/or used by the SDN controller shown in FIG. 5 and/or the CPUPCF shown in FIG. 4 and/or the user plane shown in FIG. 3.

The control unit 10 comprises processing resources 11, memory resources 12 and interfaces 13 which are interconnected by a bus 14. Functionality of the user plane, control plane, SDN controller and CPUPCF may be implemented by computer software stored in the memory resources 12 and executable by the processing resources 11, or by hardware, or by a combination of software and hardware.

According to an aspect of the present invention, a method for use in a communication network e.g. as illustrated in FIGS. 1 to 4 is provided. The method may be run in the control unit 10 shown in FIG. 6.

The method comprises acquiring first protocol elements from a user plane of a first network entity of the communication network and acquiring second protocol elements from a control plane of the first network entity, the first network entity having a split network function into the user plane and a control plane.

The method may be implemented in the control plane of the first network entity, or in the user plane of the first network entity, or in a control entity (e.g. an SDN controller as described above) of the communication network. As described above, implementation of the method in the control plane, the user plane or the control entity may be configured per service based on service requirements.

As described above, the first network entity may comprise at least one of the following: a gateway (such as PGW, SGW, BGW, MGW), a charging trigger function, a policy and charging enforcement function, a traffic detection function, an open flow controller, a proxy call session control function, an SDN controller (also referred to as control entity), an internet protocol multimedia system and an eNodeB.

As described above, the first protocol elements may comprise traffic data (e.g. volume, time) and the corresponding response after consumption, and the second protocol elements may comprise charging instructions or Rx or GTP-C signalling information.

The method further comprises generating third protocol elements from the first and second protocol elements for a second network entity of the communication network, the second network entity being separate from the first network entity.

The second network entity may comprise at least one of the following: an online charging system and an offline charging system.

As described above, the third protocol elements may comprise charging related information.

According to an implementation example of the invention, communication for acquiring the first and/or second protocol elements is performed using an open flow protocol.

According to an implementation example of the invention, the third protocol elements are transferred to the second network entity via at least one of interfaces Gz, Gzn, Gy and Gyn.

According to an implementation example of the invention, the method further comprises receiving fourth protocol elements e.g. via a Gx interface, splitting the fourth protocol elements into a user plane part and a control plane part, and forwarding the user plane part of the fourth protocol elements to the user plane of the first network entity and the control plane part of the fourth protocol elements to the control plane of the first network entity, as illustrated in FIG. 4.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method for use in a communication network, the method comprising:
   acquiring first protocol elements from a user plane of a first network entity of the communication network, the first network entity having a split network function into the user plane and a control plane;
   acquiring second protocol elements from the control plane of the first network entity, wherein the first protocol elements and the second protocol elements are different;
   generating third protocol elements from the first and second protocol elements for a second network entity of the communication network, the second network entity being separate from the first network entity,
   wherein the method is implemented in the user plane of the first network entity, wherein the third protocol elements are sent to the second network entity directly from the user plane of the first network entity.

2. The method of claim 1, comprising:
   configuring implementation of the method in the user plane per service based on service requirements.

3. The method of claim 1, wherein
   the first network entity comprises at least one of the following: a gateway, a charging trigger function, a policy and charging enforcement function, a traffic detection function, an open flow controller, a call session control function, a control entity, an internet protocol multimedia system and an eNodeB, and/or
   the second network entity comprises at least one of the following: an online charging system and an offline charging system.

4. The method of claim 1, wherein communication for acquiring the first and/or second protocol elements is performed using an open flow protocol.

5. The method of claim 1, wherein the third protocol elements are transferred to the second network entity via at least one of interfaces Gz, Gzn, Gy and Gyn.

6. The method claim 1, further comprising:
   receiving fourth protocol elements at the control plane of the first network entity;
   splitting the fourth protocol elements into a user plane part and a control plane part; and
   forwarding the user plane part of the fourth protocol elements to the user plane of the first network entity and the control plane part of the fourth protocol elements to the control plane of the first network entity.

7. A computer program product embodied on a non-transitory computer-readable medium, said computer program product comprising software code portions for performing the steps of claim 1 when the computer program product is run on a control unit.

8. The computer program product according to claim 7, wherein the computer program product is directly loadable into an internal memory of a processing device.

9. An apparatus, comprising:
   at least one processor; and
   at least one memory including computer program code, the at least one memory and the computer program code configured to, with the at least one processor, cause the apparatus at least to perform:
   acquiring first protocol elements from a user plane of a first network entity of the communication network, the first network entity having a split network function into the user plane and a control plane;
   acquiring second protocol elements from the control plane of the first network entity, wherein the first protocol elements and the second protocol elements are different; and
   generating third protocol elements from the first and second protocol elements for a second network entity of the communication network, the second network entity being separate from the first network entity,
   wherein the apparatus is implemented in the user plane of the first network entity, wherein the third protocol elements are sent to the second network entity directly from the user plane of the first network entity.

10. The apparatus of claim 9, wherein the at least one memory and the computer program code are configured to, with the at least one processor, cause the apparatus to further perform:
   receiving fourth protocol elements at the control plane of the first network entity;
   splitting the fourth protocol elements into a user plane part and a control plane part; and
   forwarding the user plane part of the fourth protocol elements to the user plane of the first network entity and the control plane part of the fourth protocol elements to the control plane of the first network entity.

* * * * *